United States Patent

[11] 3,578,343

| [72] | Inventor | Ernest J. Taschenberg |
| | | Baltimore, Md. |
| [21] | Appl. No. | 818,963 |
| [22] | Filed | Apr. 24, 1969 |
| [45] | Patented | May 11, 1971 |
| [73] | Assignee | Koppers Company, Inc. |

[54] ANNULAR SHOULDER ASSEMBLY FOR A ROTATING SEAL
7 Claims, 6 Drawing Figs.

[52] U.S. Cl. .................................................. 277/16,
277/22, 277/75
[51] Int. Cl. ...................................................... F16j 15/00,
F16j 15/40
[50] Field of Search .......................................... 277/16, 22,
74, 75, 67

[56] References Cited
UNITED STATES PATENTS

| 2,828,983 | 4/1958 | Hunt | 277/16 |
| 2,910,313 | 10/1959 | La Bour | 277/67UX |
| 2,990,202 | 6/1961 | Dennison | 277/22 |
| 3,090,654 | 5/1963 | Wald et al. | 277/22UX |
| 3,019,026 | 1/1962 | Schwing | 277/16 |

*Primary Examiner*—Samuel B. Rothberg
*Attorneys*—Boyce O. Dent, Oscar B. Brumback and Olin E. Williams

ABSTRACT: This disclosure relates to an annular shoulder assembly for a rotating seal. The shoulder assembly has an annular reservoir connected to an annular cooling chamber. An annular orifice is provided between the reservoir and the cooling chamber to control the distribution of coolant supplied to the cooling chamber from the reservoir. The annular cooling chamber extends rearwardly from the front planar surface and the coolant fluid, by the centrifugal force exerted during rotation of the annular shoulder assembly, forms a uniform film on the annular walls of the chamber to cool the annular shoulder assembly.

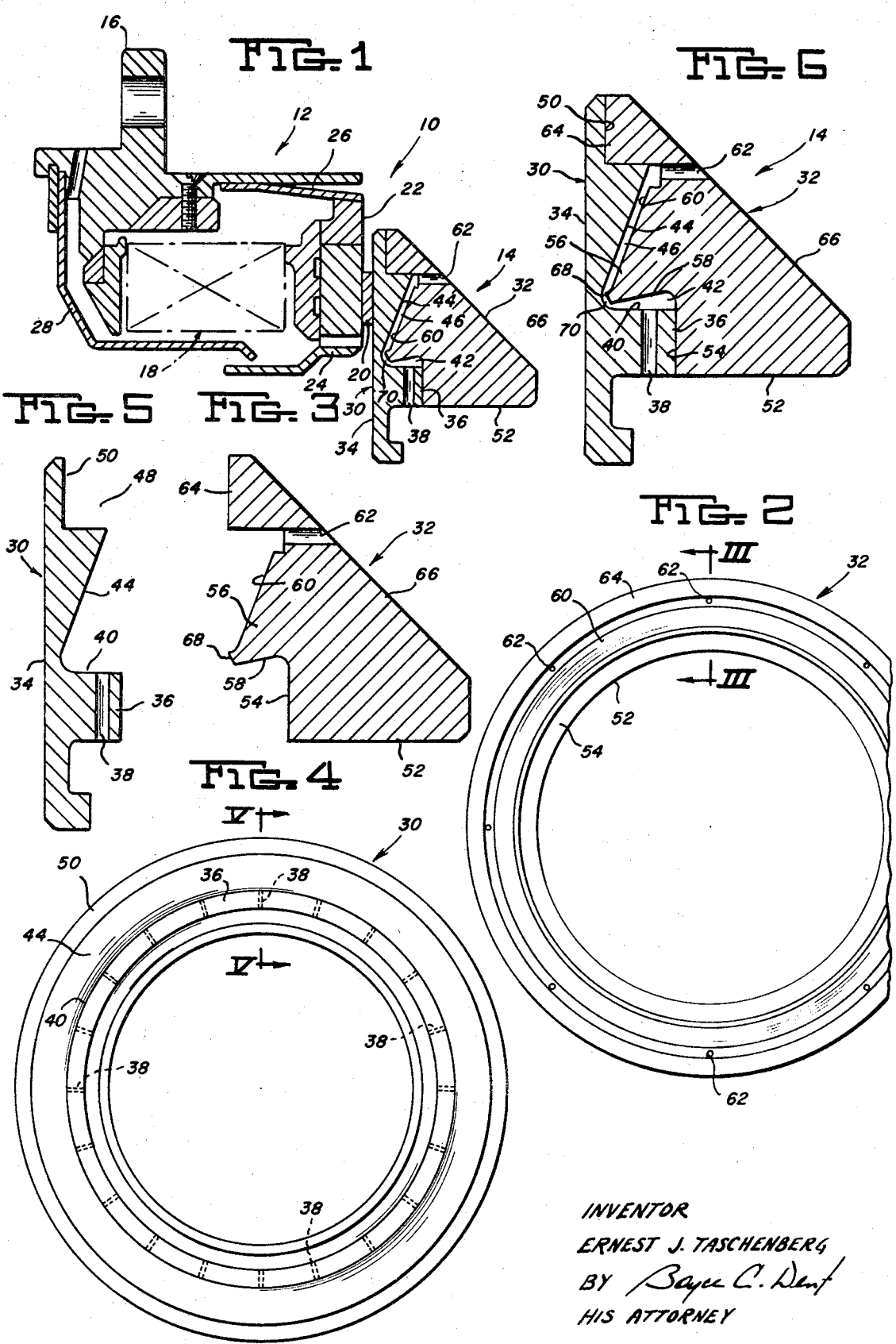

3,578,343

1

ANNULAR SHOULDER ASSEMBLY FOR A ROTATING SEAL

BACKGROUND OF THE INVENTION

1. Field of the Invention

This invention relates to an annular shoulder assembly for a rotating seal and more particularly to a fluid-cooled annular shoulder assembly for a bellows-type rotating seal.

2. Description of the Prior Art

Bellows-type seals are employed to seal a rotating member relative to a fixed member. The bellows-type seal includes two rubbing surfaces and a seal ring with a planar front surface that is biased against a planar surface of a shoulder assembly to provide a fluid tight seal therebetween. At high speeds of rotation, as for example 14,000 r.p.m., substantial frictional heat is generated between the seal ring and the rotating shoulder assembly. For efficient operation it is necessary to remove the heat generated by the rubbing surfaces of the shoulder assembly and seal ring. Proposals have been made in the past to supply a coolant fluid to the shoulder assembly to remove the heat therefrom. The cooling by the previous proposals has been nonuniform which, in turn, reduced the seal efficiency.

SUMMARY OF THE INVENTION

The hereinafter described invention relates to an annular shoulder assembly for a rotary seal in which there is provided an annular chamber supplied with cooling fluid from an annular reservoir. An orifice is provided in the annular reservoir to distribute the fluid to the annular chamber and thereby provide a thin, uniform sheet or film of coolant fluid in the chamber to uniformly extract heat from the annular shoulder assembly front face portion. Inlet passageways are provided for the reservoir and outlet passageways are provided adjacent the peripheral end of the chamber to circulate coolant fluid from the reservoir through the chamber.

BRIEF DESCRIPTION OF THE DRAWINGS

FIG. 1 is a view in section of an annular bellows seal assembly including the improved annular shoulder assembly.

FIG. 2 is a rear plan view of the shoulder assembly shoulder back portion.

FIG. 3 is a view in section taken along the line 3–3 of FIG. 2.

FIG. 4 is a plan view of the rear surface of the shoulder face portion.

FIG. 5 is a view in section taken along the line 5–5 of FIG. 4.

FIG. 6 is an enlarged view in section of the assembled annular shoulder assembly.

DESCRIPTION OF THE PREFERRED EMBODIMENT

Referring to the drawings and particularly FIG. 1, there is illustrated in section a bellows seal assembly generally designated by the numeral 10 that includes an annular bellows seal 12 and an annular shoulder assembly 14. The annular bellows seal 12 includes an annular housing 16 in which a plurality of bellows 18 are positioned. An annular seal ring 20 is secured to a seal ring retainer 22 by means of a seal ring adapter 24. The bellows assembly 18 abuts the rear face of the seal ring adapter 24 and urges the seal ring 20 against the planar face of the annular shoulder assembly 14. A finger spring 26 provides vibrational damping of the seal ring 12 and is suitably secured to the housing 16. An annular heat shield 28 surrounds the bellows assembly 18. The above bellows seal 12 is described for illustration purposes only and it should be understood that other types of seal assemblies may be used with equal facility as long as an annular seal ring 20 is urged against a planar surface of the shoulder assembly 14 to provide a seal therebetween.

The annular bellows seal is suitably secured to a nonrotating member and the annular shoulder assembly 14 is suitably secured to a rotating member. There is also provided a source of coolant fluid, as will later be explained, for the shoulder assembly 14.

2

Now referring to FIGS. 2, 3, 4, 5 and 6, the shoulder assembly 14 is illustrated in detail and includes a shoulder face portion 30 illustrated in FIGS. 4 and 5 and a shoulder back portion 32 illustrated in FIGS. 2 and 3. The shoulder back portion 32 is suitably secured to the shoulder face portion to form the shoulder assembly 14 illustrated in FIG. 6. The shoulder face portion 30 has an annular radially extending front planar surface 34 against which the seal ring 20 is urged to provide a seal therebetween. An annular lip portion 36 extends rearwardly from the shoulder face portion 30 and has a plurality of radially extending passageways 38 therethrough. As later discussed, the passageways 38 are fluid coolant inlet passageways. The annular lip portion 36 has an outer cylindrical surface 40 that forms a wall of the reservoir 42 illustrated in FIG. 6. The shoulder face portion 30 has a rear inclined surface 44 that forms a wall of the chamber 46 illustrated in FIG. 6 and an annular peripheral recess 48 with a rear planar surface 50.

The shoulder back portion 32 has an inner cylindrical surface 52 and an inner annular front planar surface 54 from which an annular protuberance 56 extends forwardly. The protuberance 56 has a forwardly extending annular wall 58 that joins the inner annular front surface 54 at an angle of approximately 80°. The annular wall 58 forms an annular wall of the reservoir 42 to provide the conical configuration in section as illustrated in FIG. 6. The annular protuberance 56 has a rearwardly inclined wall 60 that forms a wall of the reservoir 46.

The shoulder back portion 32 has a plurality of longitudinally extending passageways 62 opening into the annular rear inclined surface 66 which, as later discussed, are outlet passageways for the coolant fluid. The shoulder back portion 32 has an annular peripheral lip portion 64 which is positioned in the annular recessed portion 48 of shoulder face portion 30 for assembly. The protuberance 56 has an annular front edge portion 68 that extends at an angle of approximately 30° with the radial axis to form one wall of an orifice 70 between the reservoir 42 and the chamber 46.

The shoulder back portion 32 is positioned on the shoulder face portion 30 and secured thereto with the annular lip portion 64 positioned in the annular recessed portion 48 and the annular portion 54 abutting the surface 36 of shoulder face portion 30.

When assembled, the annular surfaces 40 and 58 form the walls of the reservoir 42 with the front edge 68 of protuberance 56 spaced from the curved jointure of surfaces 40 and 44 to form the orifice of reduced cross section between the reservoir 42 and the chamber 46. The annular surfaces 44 and 60 form a chamber 46 with substantially parallel walls with the outlet passageways 62 connected thereto. The annular chamber 46 extends rearwardly from the reservoir 42 and is in overlying relation with that portion of the front face 34 that is in abutting relation with the annular seal ring 20.

With the above-described configuration, coolant fluid as, for example, coolant oil, is supplied through the inlet passageways 38 to the reservoir 42. The conical shape of the reservoir 42, because of the curved configuration of annular surface 58 and the high speed rotation of the shoulder assembly 14, meters cooling fluid through the annular orifice 70 into the chamber 46. In chamber 46 the cooling fluid forms a thin, uniform sheet along the surface 44 and extracts heat from the shoulder assembly 14. The centrifugal force exerted on the coolant fluid by the high speed rotation of shoulder assembly 14 and the rearwardly extending chamber 46 urges the coolant fluid against the annular wall 44 to provide a thin, uniform sheet or film of coolant fluid on the surface 44. The coolant fluid is propelled along the surface 44 and out of the shoulder assembly 14 through the outlet passageways 62. It should be noted that there are provided approximately twenty inlet passageways 38 in the shoulder face portion and eight outlet passageways in the shoulder back portion 32. The number of inlet and outlet passageways may be varied for different operating conditions of the seal assembly 10. It is preferred, however, because of the centrifugal forces exerted on the coolant fluid, that there be a greater number of inlet passageways than outlet passageways. Also, because of the annular arrangement of the reservoir 42 and the annular arrangement of the chamber 46, no orientation of the passageways 38 and 62 is necessary.

It will be appreciated with the above-described shoulder assembly that it is now possible to efficiently extract heat from the shoulder assembly and the seal ring by circulating coolant fluid through a chamber as a thin, uniform sheet or film. The configuration of the reservoir and the orifice regulate the amount of coolant fluid supplied to the chamber 46 and provide for highly efficient cooling of the shoulder assembly 14.

Although the drawings show that cooling oil enters radial passageways 38 radially, it should be understood that these passageways may be oriented as required for connection to the source of cooling oil. For example, inner cylindrical surface 52 may be conical so that it slopes outwardly from the shaft (not shown) toward passageways 38.

According to the provisions of the patent statutes, the principle, preferred construction and mode of operation of this invention have been explained and what is now considered to represent its best embodiment has been illustrated and described.

I claim:

1. An annular shoulder assembly for a rotating seal comprising,
    an annular body portion having an annular radially extending front planar surface, a substantially cylindrical inner surface and an annular outer surface,
    said front planar surface adapted to abut the planar surface of a seal ring biased against said front planar surface to provide a fluidtight seal therebetween upon rotation of one of said planar surfaces relative to the other planar surface,
    an annular reservoir in said body portion spaced inwardly from said body portion substantially cylindrical inner surface, said annular reservoir having a pair of diverging walls and a substantially conical shape in cross section,
    an annular chamber connected at one end to said reservoir and extending outwardly therefrom, said annular chamber having a pair of spaced walls inclined rearwardly relative to said planar front surface,
    a plurality of inlet passageways extending from said inner cylindrical surface into said reservoir and a plurality of outlet passageways extending from said outer annular surface to said annular chamber,
    an annular lip member between said annular reservoir and said annular chamber forming an orifice therebetween to control and distribute the amount of coolant fluid flowing into said chamber, and
    said inlet passageways arranged to supply a coolant fluid to said annular reservoir, said annular reservoir arranged to supply a preselected amount of coolant fluid to said chamber to extract heat from said body portion and said outlet passages arranged to conduct said coolant fluid from said annular chamber.

2. An annular shoulder assembly for a rotating seal as set forth in claim 1 in which,
    said body portion front planar surface is arranged to rotate relative to said seal ring and centrifugally propel the coolant fluid through said chamber as a uniform film to extract heat from said body portion.

3. A shoulder assembly for a rotating seal as set forth in claim 2 in which,
    said annular reservoir extends longitudinally in said body portion toward said front planar surface.

4. An annular shoulder assembly for a rotating seal as set forth in claim 1 in which,
    one of said pair of spaced walls of said annular chamber forming a rearwardly extending annular front wall and upon rotation of said annular shoulder assembly the coolant fluid forms a uniform film on said annular front wall.

5. An annular shoulder assembly for a rotating seal as set forth in claim 1 in which said inlet passageways open into said reservoir at a location spaced from said annular lip member.

6. An annular shoulder assembly for a rotating seal as set forth in claim 1 in which the number of said inlet passageways exceeds the number of outlet passageways.

7. An annular shoulder assembly for a rotating seal as set forth in claim 1 in which,
    said body portion includes a shoulder face portion and a shoulder back portion,
    said shoulder face portion having said front planar surface and an annular lip portion forming a portion of said substantially cylindrical inner surface, said annular lip portion having an outer cylindrical surface, said inlet passageways extending through said annular lip portion,
    said cylindrical outer surface of said lip portion forming one of said walls of said reservoir,
    said shoulder face portion having a rear inclined annular surface forming one of said walls of said chamber and an annular rear recessed portion adjacent the periphery thereof,
    said shoulder back portion having an inner cylindrical surface and an inner annular front surface, said shoulder back portion having a forwardly extending annular protuberance with an inner inclined surface and an outer inclined surface,
    said inner surface of said annular protuberance forming one of said walls of said reservoir and said outer inclined surface forming one of said walls of said chamber, said shoulder back portion having a peripheral lip portion with said outlet passageways extending therethrough,
    said shoulder back portion positioned on said shoulder face portion with said annular peripheral lip portion positioned in said shoulder face portion peripheral recessed portion to form a shoulder assembly including a reservoir and a coolant chamber.